US011825476B2

(12) United States Patent
Kubota et al.

(10) Patent No.: US 11,825,476 B2
(45) Date of Patent: Nov. 21, 2023

(54) COMMUNICATION OF DIRECT CURRENT (DC) TONE LOCATION

(71) Applicant: QUALCOMM Incorporated, San Diego, CA (US)

(72) Inventors: Keiichi Kubota, Setagaya-ku (JP); Tao Luo, San Diego, CA (US); Alexandros Manolakos, San Diego, CA (US); Wooseok Nam, San Diego, CA (US); Sumit Verma, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/452,222

(22) Filed: Oct. 25, 2021

(65) Prior Publication Data

US 2022/0150880 A1 May 12, 2022

Related U.S. Application Data

(63) Continuation of application No. 16/378,401, filed on Apr. 8, 2019, now Pat. No. 11,160,055.
(Continued)

(51) Int. Cl.
*H04L 5/00* (2006.01)
*H04W 56/00* (2009.01)
(Continued)

(52) U.S. Cl.
CPC ............. *H04W 72/20* (2023.01); *H04L 5/001* (2013.01); *H04L 5/0092* (2013.01);
(Continued)

(58) Field of Classification Search
CPC ......... H04W 72/0406; H04W 72/0453; H04W 72/0413; H04W 56/0035; H04W 72/20;
(Continued)

(56) References Cited

U.S. PATENT DOCUMENTS 7,773,679 B2   8/2010  Laroia et al.
10,200,872 B2  2/2019  Sakhnini et al.
(Continued)

FOREIGN PATENT DOCUMENTS

CN   105577337 A      5/2016
EP       2883405 B1 *  7/2016  ............... H04L 5/00
(Continued)

OTHER PUBLICATIONS

Taiwan Search Report—TW108112458—TIPO—dated May 8, 2022.
(Continued)

*Primary Examiner* — Omar J Ghowrwal
(74) *Attorney, Agent, or Firm* — Haynes and Boone, LLP/Qualcomm Incorporated

(57) ABSTRACT

Wireless communications systems and methods related to signaling of direct current (DC) locations of user equipment devices (UEs) in a new radio (NR) network are provided. A wireless communication device receives, from a base station, at least one of a carrier aggregation (CA) configuration or a bandwidth part (BWP) configuration. The wireless communication device determines a direct current (DC) location based on at least one of the CA configuration or the BWP configuration. The wireless communication device transmits, to the base station, a report based on the determined DC location. The wireless communication device communicates, with the base station, a phase tracking reference signal (PTRS) configured based on the report.

26 Claims, 14 Drawing Sheets

Related U.S. Application Data

(60) Provisional application No. 62/680,225, filed on Jun. 4, 2018, provisional application No. 62/660,164, filed on Apr. 19, 2018, provisional application No. 62/655,797, filed on Apr. 10, 2018.

(51) Int. Cl.
*H04W 72/20* (2023.01)
*H04W 72/0453* (2023.01)
*H04W 72/21* (2023.01)

(52) U.S. Cl.
CPC ... *H04W 56/0035* (2013.01); *H04W 72/0453* (2013.01); *H04W 72/21* (2023.01); *H04L 5/0048* (2013.01); *H04L 5/0053* (2013.01)

(58) Field of Classification Search
CPC .... H04W 72/21; H04L 5/0092; H04L 5/0048; H04L 5/0053; H04L 5/001
See application file for complete search history.

(56) References Cited

U.S. PATENT DOCUMENTS

| | | | |
|---|---|---|---|
| 11,160,055 B2 * | 10/2021 | Kubota | H04W 56/0035 |
| 2013/0223295 A1 * | 8/2013 | Choi | H04W 72/20 370/280 |
| 2018/0091350 A1 | 3/2018 | Akkarakaran et al. | |
| 2018/0124726 A1 | 5/2018 | Zhang et al. | |
| 2018/0368145 A1 | 12/2018 | Abdoli et al. | |
| 2019/0081844 A1 | 3/2019 | Lee et al. | |
| 2019/0313394 A1 | 10/2019 | Kubota et al. | |
| 2020/0220675 A1 | 7/2020 | Lee et al. | |

FOREIGN PATENT DOCUMENTS

| | | |
|---|---|---|
| EP | 3182632 A1 | 6/2017 |
| EP | 3209044 A1 | 8/2017 |
| WO | 2007008614 | 1/2007 |
| WO | 2011136207 A1 | 11/2011 |
| WO | 2016057803 | 4/2016 |
| WO | 2017043801 A1 | 3/2017 |
| WO | 2017200315 A1 | 11/2017 |
| WO | 2018059387 A1 | 4/2018 |
| WO | 2018064313 A1 | 4/2018 |

OTHER PUBLICATIONS

ERICSSON: "Review Issue List for TS 38.331 EN-DC ASN.1 freeze," Jan. 2018, 3GPP TSG-RAN2#AH-1801, pp. 1-519 [online], [retrieved on Jun. 17, 2021]. Retrieved from the Internet https://www.3gpp.org/ftp/tsg_ran/WG1_RL1/TSGR1_102-e/Inbox/Chairman_notes/Chairman's%20Notes%20RAN1%23102-e%20v014.doc (Year: 2018).

International Preliminary Report on Patentability—PCT/US2019/026568, The International Bureau of WIPO—Geneva, Switzerland, dated Oct. 22, 2020.

International Search Report and Written Opinion—PCT/US2019/026568—ISA/EPO—dated Jun. 12, 2019.

* cited by examiner

| PTRS-RE-offset by RRC | Sub-carrier index for PT-RS | | | |
|---|---|---|---|---|
| | DMRS port 1000 | DMRS port 1001 | DMRS port 1002 | DMRS port 1003 |
| 00 | 0 | 2 | 1 | 3 |
| 01 | 2 (6) | (4) | 3 | 5 |
| 10 | 8 | 8 | 7 | 9 |
| 11 | | 10 | 9 | 11 |

FIG. 12

COMMUNICATION OF DIRECT CURRENT (DC) TONE LOCATION

CROSS REFERENCE TO RELATED APPLICATIONS

The present application is a continuation of U.S. patent application Ser. No. 16/378,401, filed Apr. 8, 2019, which claims priority to and the benefit of the U.S. Provisional Patent Application No. 62/680,225, filed Jun. 4, 2018, U.S. Provisional Patent Application No. 62/660,164, filed Apr. 19, 2018, and U.S. Provisional Patent Application No. 62/655,797, filed Apr. 10, 2018, each of which is hereby incorporated by reference in its entirety as if fully set forth below and for all applicable purposes.

TECHNICAL FIELD

This application relates to wireless communication systems, and more particularly to signaling of direct current (DC) locations of user equipment devices (UEs) in a new radio (NR) network. Certain embodiments can enable and provide solutions and techniques for UEs to efficiently report DC locations to improve reference signal (e.g., phase tracking reference signals (PTRSs)) communication.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. In addition, NR is designed to operate across different spectrum types, from licensed spectrum to unlicensed and shared spectrum.

While the use of higher frequencies (e.g., above 6 GHz) can provide a greater transmission capacity, phase noise levels may increase with the higher frequencies. Phase noise can impact the performance of certain wireless communication systems. Accordingly, a transmitter may transmit a reference signal, such as a phase tracking reference signal (PTRS), to facilitate phase noise estimations and corrections at a receiver.

Depending on the location of a reference signal within radio frequency (RF) resources, however, a receiver may be unable to efficiently receive the reference signal due to interference with tones within the resources. For example, a direct current (DC) frequency tone can have a large, negative impact on the performance of a baseband receiver. The DC frequency tone can cause high interference and/or high noise for signal processing and/or a worse error vector magnitude (EVM) at the receiver. Some receivers may apply DC rejection filtering or puncturing to disregard the tone affected by DC. As such, to enable a receiver to efficiently receive a reference signal, a transmitter may avoid transmitting a reference signal using frequency resources that overlap with the DC tone location of the receiver.

In certain wireless communication devices or user equipment devices (UEs), the DC frequency location may be dependent on the receiver's implementation. For example, in an NR network, a BS may configure a UE for communications in various bandwidth parts (BWPs) within various component carriers (CC). Different UEs may have different radio frequency (RF) receiver implementations. For example, some UEs may use a single RF and/or baseband chains for all CCs and/or all BWPs, while other UEs may use different RF and/or baseband chains for different CCs and/or different BWPs. Thus, the DC tone location may vary among different UEs, as well as within the same UE depending on the RF frontend configuration in use. Accordingly, a network may determine reference signal configurations according to DC tone locations of UEs.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide mechanisms for efficient reporting of direct current (DC) locations. For example, a user equipment (UE) may report DC location information related to the UE's receiver and/or the UE's transmitter based on certain events, such as a carrier aggregation (CA) reconfiguration command, a bandwidth part (BWP) switch command, and/or a BWP reconfiguration command received from a base station (BS). The UE may report DC locations per BWP and per component carrier (CC). The BS may configure the UE with a set of reference BWPs for DC location reporting to reduce the amount of DC location information. The BS may configure the UE with a resource mapping for UL and/or DL reference signal (e.g., PTRS) communications based on the DC location report. Alternatively, the UE may request the BS to use a certain resource mapping for reference signal (e.g., PTRS) communications based on the UE's transmitter and/or receiver DC locations.

For example, in an aspect of the disclosure, a method of wireless communication is provided that includes receiving, by a wireless communication device from a base station, at least one of a carrier aggregation (CA) configuration or a bandwidth part (BWP) configuration. The method also includes determining, by the wireless communication device, a direct current (DC) location based on at least one of the CA configuration or the BWP configuration. The method also includes transmitting, by the wireless communication device to the base station, a report based on the determined DC location.

In an additional aspect of the disclosure, a method of wireless communication is provided that includes transmitting, by a base station to a wireless communication device, at least one of a carrier aggregation (CA) configuration or a bandwidth part (BWP) configuration. The method also includes receiving, by the base station from the wireless communication device, a report indicating direct current (DC) location information associated with the wireless communication device in response to at least one of the CA configuration or the BWP configuration.

In an additional aspect of the disclosure, an apparatus is provided that includes a processor configured to determine a direct current (DC) location based on at least one of a carrier aggregation (CA) configuration or a bandwidth part (BWP) configuration. The apparatus also includes a transceiver configured to receive, from a base station, the at least one of the CA configuration or the BWP configuration. The transceiver is also configured to transmit, to the base station, a report based on the determined DC location.

In an additional aspect of the disclosure, an apparatus is provided that includes a transceiver configured to transmit, to a wireless communication device, at least one of a carrier aggregation (CA) configuration or a bandwidth part (BWP) configuration. The transceiver is also configured to receive, from the wireless communication device, a report indicating direct current (DC) location information associated with the wireless communication device in response to at least one of the CA configuration or the BWP configuration.

In an additional aspect of the disclosure, a computer-readable medium having program code recorded thereon is provided. The program code includes code for causing a wireless communication device to receive, from a base station, at least one of a carrier aggregation (CA) configuration or a bandwidth part (BWP) configuration. The program code also includes code for causing the wireless communication device to determine a direct current (DC) location based on at least one of the CA configuration or the BWP configuration. The program code also includes code for causing the wireless communication device to transmit, to the base station, a report based on the determined DC location.

In an additional aspect of the disclosure, a computer-readable medium having program code recorded thereon is provided. The program code includes code for causing a base station to transmit, to a wireless communication device, at least one of a carrier aggregation (CA) configuration or a bandwidth part (BWP) configuration. The program code also includes code for causing the base station to receive, from the wireless communication device, a report indicating direct current (DC) location information associated with the wireless communication device in response to at least one of the CA configuration or the BWP configuration.

In an additional aspect of the disclosure, an apparatus is provided that includes means for receiving, from a base station, at least one of a carrier aggregation (CA) configuration or a bandwidth part (BWP) configuration. The apparatus also includes means for determining a direct current (DC) location based on at least one of the CA configuration or the BWP configuration. The apparatus also includes means for transmitting, to the base station, a report based on the determined DC location.

In an additional aspect of the disclosure, an apparatus is provided that includes means for transmitting, to a wireless communication device, at least one of a carrier aggregation (CA) configuration or a bandwidth part (BWP) configuration. The apparatus also includes means for receiving, from the wireless communication device, a report indicating direct current (DC) location information associated with the wireless communication device in response to at least one of the CA configuration or the BWP configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 12 illustrates a phase tracking reference signal (PTRS) resource element-level (RE-level) offset configuration according to some embodiments of the present disclosure.

DETAILED DESCRIPTION

Figure 1:
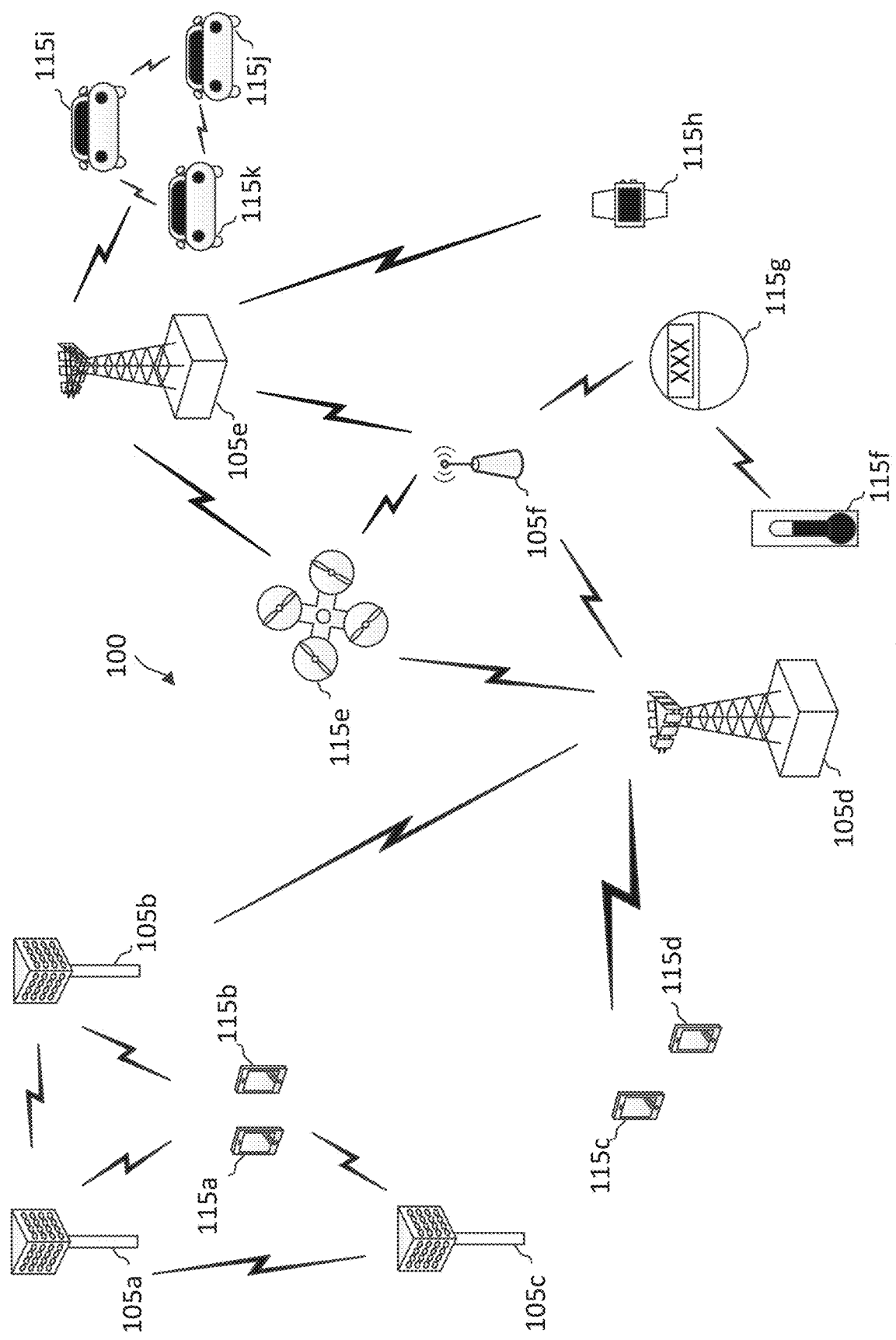
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, orthogonal frequency division multiplexing (OFDM) and the like. UTRA, E-UTRA, and Global System for Mobile Communications (GSM) are part of universal mobile telecommunication system (UMTS). In particular, long-term evolution (LTE) is a release of UMTS that uses E-UTRA. UTRA, E-UTRA, GSM, UMTS and LTE are described in documents provided from an organization named "3rd Generation Partnership Project" (3GPP), and cdma2000® is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long-term evolution LTE is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time period (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

NR may provide phase tracking reference signals (PTRSs) to facilitate phase tracking at UEs and BSs. For example, a BS may include a PTRS in a DL signal to enable a UE to track and correct the phase error in the received DL signal. Similarly, a UE may include a PTRS in a UL signal to enable a BS to track and correct the phase error in the received UL signal. In some instances, PTRSs may be present in a DL signal and/or a UL signal frequently. For example, a network may configure a PTRS transmission in a DL signal or a UL signal at every symbol using one subcarrier.

As described above, a DC frequency tone can cause high noise at the DC location. To avoid having a PTRS being filtered out due to DC rejection filtering or being interfered by a DC tone, a network may schedule PTRS transmissions on frequencies different from a frequency or frequencies that correspond to a DC tone of a UE. In other words, the network may configure resources for PTRS transmissions based on the DC tone locations of a UE's transmitter and receiver. However, as described above, different UEs may have different DC tone locations depending on the RF configurations, which may be based on a CC configuration and/or a BWP configuration of a UE. While a UE can report DC locations used of the UE's transmitter and receiver to the BS, the signaling may be complex. For example, the number of potential DC locations can be large when taking into account of BWPs and CC, where a radio access network (RAN) may configure up to about eight CCs in a particular frequency band and up to about four configured BWPs in each CC. Thus, a UE may be required to signal up to about $4^8$ combinations of DC locations to the network. Assuming each DC location requires a 12-bit information element field (as the value range is 0 to 3299), then the $4^8$ DC locations reporting may require at least a UL signaling space of about 800 kilobits. Further, a UE may be required to process a received radio resource control (RRC) message (e.g., including CA/CC/BWP configuration commands) and send back a response message within about 15 milliseconds (ms) for the worst case. The computational power required for the identification of the DC locations for all the possible combinations may be large, and thus may be difficult to satisfy the RRC processing time requirement.

The present application describes mechanisms for a UE to efficiently signal DC location information to a BS. The reporting of DC location information may be triggered by events, such as a carrier aggregation (CA) reconfiguration command, a bandwidth part (BWP) switch command, and/or a BWP reconfiguration command received from the BS. The UE may determine the DC location by considering a CA configuration and/or BWP configurations. To reduce the amount of information bits required for the signaling, the BS may provide the UE with a set of reference BWPs for DC location reporting. The UE may determine DC locations for the set of reference BWPs and report corresponding DC locations for the reference BWPs. The DC locations may include one or more DC locations of the UE's transmitter (e.g., for UL transmission) and one or more DC locations of the UE's receiver (e.g., for downlink reception).

In an embodiment, the UE may include a band report including DC locations as a function of configured bands or BWPs. In an embodiment, the UE may report a subcarrier offset of a subcarrier within a resource block (RB) overlapping with the DC location and/or the location of the RB. In an embodiment, the UE may select a PTRS-resource element (RE)-offset parameter for a determined DC location and report the PTRS-RE-offset parameter to the BS. The BS may configure PTRSs according to the reported subcarrier offset, the reported RB, and/or the reported PTRS-RE-offset parameter.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource configuration (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring. After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged.

In some embodiments, the network 100 may be an NR network. The DC tone locations at different UEs 115 may be different. In some embodiments, the UEs 115 may configure different DC tones for different component carrier (CC) configurations. In some embodiments, the UEs 115 may configure different DC tones for different bandwidth part (BWP) configurations. At the radio frontend (RF) receiver of a UE 115, there may be peak signal at the DC location. The peak signal is a source of noise for signal processing at the receiver. Thus, the baseband processing of the UE may filter out some frequencies near by the DC tone. In an embodiment, the BSs 105 may transmit phase tracking reference signals (PTRSs) to facilitate phase tracking at the UEs 115. To avoid collisions between the PTRSs and the DC tone locations of the UEs 115, the UEs 115 may report corresponding DC tone locations to the BSs 105 and the BSs may configure PTRSs based on the DC tone location reports. U.S. patent application Ser. No. 15/707,821 and U.S. Publication No. 2018/0091350 describe enhancements to PTRS design and scrambling, each of which is hereby incorporated by reference in its entirety and for all applicable purposes. Mechanisms for DC tone location reporting and PTRS configurations are described in greater detail herein.

Figure 2:
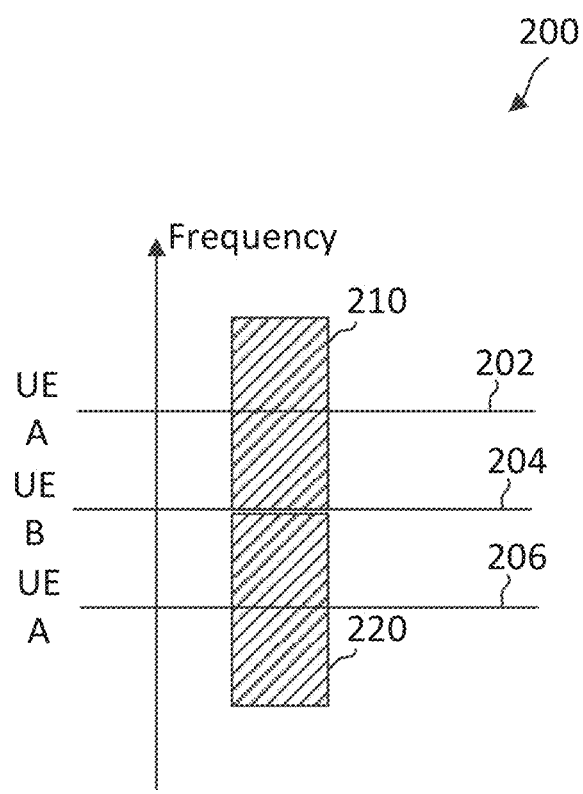
FIG. 2 illustrates an example scenario with user equipment devices (UEs) having different direct current (DC) locations according to some embodiments of the present disclosure.

FIG. 2 illustrates an example scenario 200 with UEs having different DC locations according to some embodiments of the present disclosure. The UEs may correspond to the UEs 115 of the network 100. In FIG. 2, the y-axis represents frequency in some constant units. For example, a network may be configured with two CCs 210 and 220. A UE A and a UE B of the network may have different DC locations. For example, UE A may use one RF and/or baseband chain for communicating over the CC 210 and another RF and/or baseband chain for communicating over the CC 220. Conversely, UE B may use the same RF and/or baseband chain for communicating over the CC 210 and the CC 220. As shown, UE A is configured with a DC location 202 for the CC 210 and a different DC location 206 for the CC 220, while UE B is configured with a DC location 204 for both the CC 210 and the CC 220. The DC locations 202 and 206 may be DC locations of the UE A's transmitter and/or the UE A's receiver. Similarly, the DC location 204 may be a DC location of the UE B's transmitter and/or the UE B's receiver.

In an embodiment, a UE may determine the DC location based on a current RF configuration. The current RF configuration may be dependent on a carried aggregation (CA) configuration and/or an active BWP configuration. In some embodiments, the transmitter and the receiver of a UE may have different DC locations. In some other embodiments, the transmitter and the receiver of a UE may have the same DC locations.

In an embodiment, the DC location of a UE is dependent on the implementation of the UE. As such, each UE in a network can have a different DC location. For example, one UE (chipset) may choose the center frequency of a CC as the DC location, another UE (chipset) may choose the center frequency of contiguous CCs, or yet another UE (chipset) may choose the center frequency of all configured CCs regardless of whether the CCs are contiguous or non-contiguous.

In an embodiment, a UE may determine the DC location further based on a configured BWP. Each BWP may have a different center frequency and a UE may change the DC location upon a BWP switch command to another configured BWP. Thus, a UE may have different DC locations for different BWPs.

Figure 3:
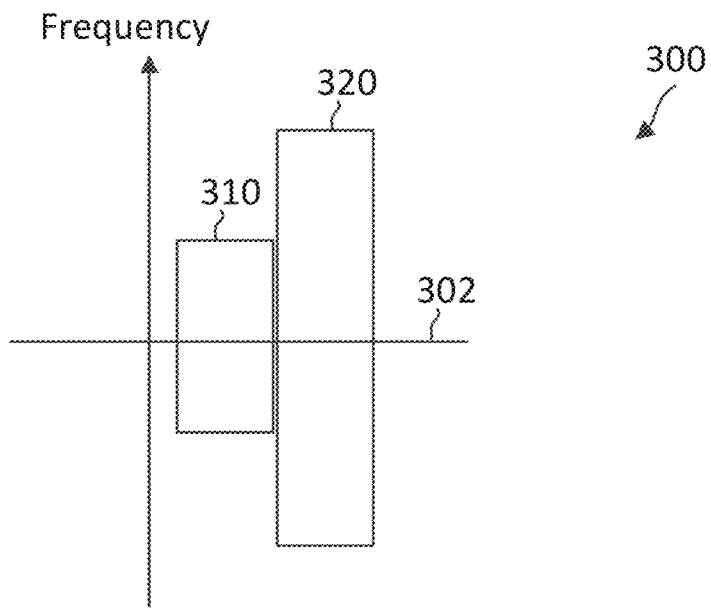
FIG. 3 illustrates an example bandwidth part (BWP) configuration according to some embodiments of the present disclosure.

FIG. 3 illustrates an example BWP configuration 300 according to some embodiments of the present disclosure. The configuration 300 may be employed by the network 100 for BWP configurations. For example, a BS such as the BSs 105 may configure up to about four BWPs for each CC (e.g., the CCs 210 and 220) and may configure a UE such as the UEs 115 with one of the BWP as an active BWP for data communications. In FIG. 3, the y-axis represents frequency in some constant units. The configuration 300 includes a BWP 310 and a BWP 320. The BWPs 310 and 320 have the same center frequency 302. In an embodiment, when a UE is configured with the BWP 310 and 320, the UE may configure the same DC location for both BWPs 310 and 320. In other words, the UE may not change the DC location when switching between the BWPs 310 and 320.

Figure 4:
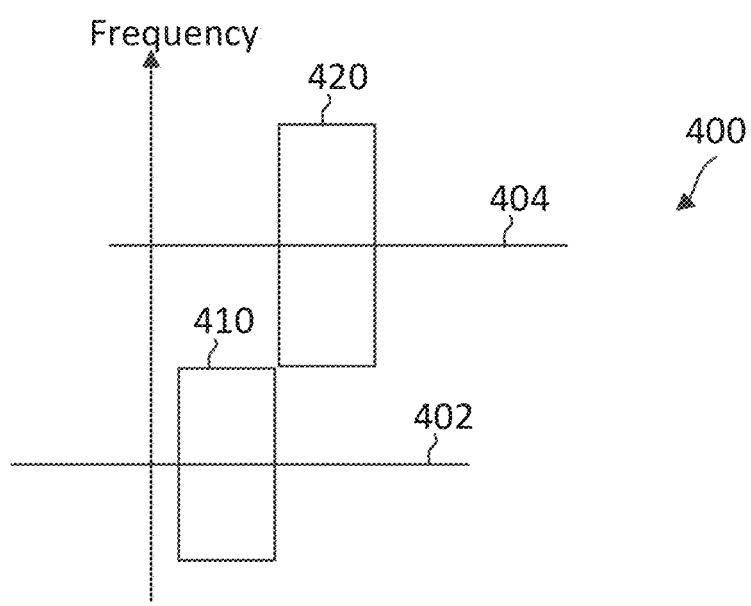
FIG. 4 illustrates an example BWP configuration according to some embodiments of the present disclosure.

FIG. 4 illustrates an example BWP configuration 400 according to some embodiments of the procedure. The configuration 400 may be employed by the network 100. In FIG. 4, the y-axis represents frequency in some constant units. Similar to the configuration 300, a BS such as the BSs 105 may configure up to about four BWPs for each CC (e.g., the CCs 210 and 220) and may configure a UE such as the UEs 115 with one of the BWP as an active BWP for data communications. However, the BS may configure BWPs with different center frequencies. As shown, the configuration 400 includes a BWP 410 and a BWP 420. The BWP 410 includes a center frequency 402. The BWP 420 includes a center frequency 404 different from the center frequency 402. In an embodiment, a UE may apply different DC locations for the BWPs 410 and 420. In other words, the UE may change the DC location when switching between the BWPs 410 and 420.

Figure 5:
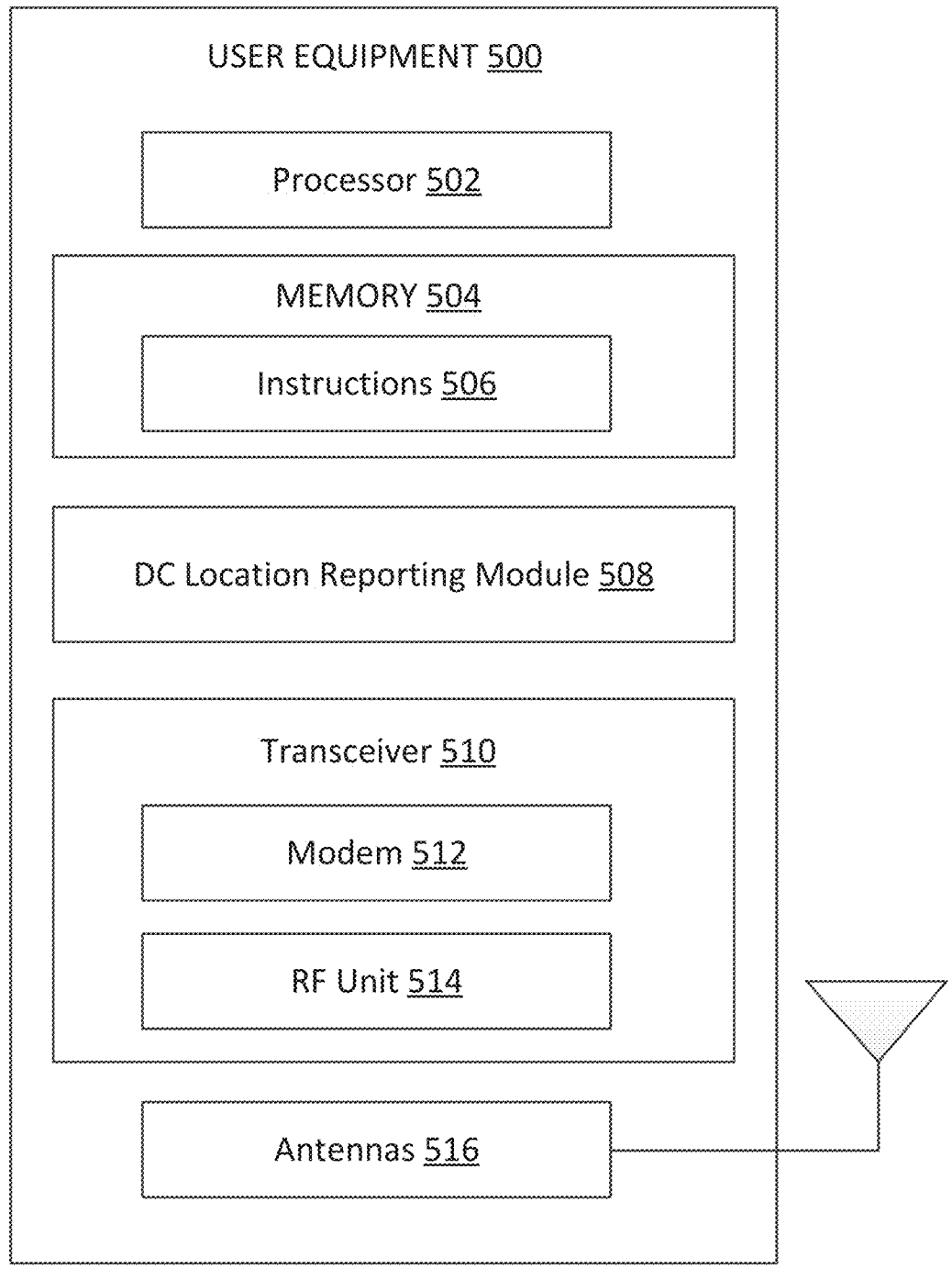
FIG. 5 is a block diagram of an exemplary user equipment (UE) according to some embodiments of the present disclosure.

FIG. 5 is a block diagram of an exemplary UE 500 according to embodiments of the present disclosure. The UE 500 may be a UE 115 or a UE 215 as discussed above. As shown, the UE 500 may include a processor 502, a memory 504, a DC location reporting module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 115 in connection with embodiments of the present disclosure, for example, aspects of FIGS. 7-14. Instructions 506 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The DC location reporting module 508 may be implemented via hardware, software, or combinations thereof. For example, the DC location reporting module 508 may be implemented as a processor, circuit, and/or instructions 506 stored in the memory 504 and executed by the processor 502. In some examples, the DC location reporting module 508 can be integrated within the modem subsystem 512. For example, the DC location reporting module 508 can be implemented by a combination of software components (e.g., executed by a DSP or a general processor) and hardware components (e.g., logic gates and circuitry) within the modem subsystem 512.

The DC location reporting module 508 may be used for various aspects of the present disclosure, for example, aspects of FIGS. 7-14. For example, the DC location reporting module 508 is configured to receive a CA configuration/reconfiguration command, a CC configuration/reconfiguration command, and/or a BWP configuration/switch command from a BS such as the BSs 105, determine DC locations based on the received commands and/or the RF implementations of the UE 500, select a UL PTRS configuration and/or a DL PTRS configuration based on the determined DC locations, report DC location information and/or PTRS configuration selections to the BS, receive UL and/or DL PTRS configurations from the BS, and/or include PTRSs in UL transmissions based on the received UL and/or DL PTRS configurations, as described in greater detail herein.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504, and/or the DC location reporting module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The antennas 516 may include multiple antennas of similar or different designs in order to sustain multiple transmission links. The RF unit 514 may configure the antennas 516.

In some embodiments, the UE 500 may include multiple modem subsystems 512 and/or multiple RF units 514. The modem subsystems 512 may perform processing at a baseband. Thus, the modem subsystems 512 may be referred to as baseband transmitters and/or baseband receivers. In the transmit path, the RF units 514 may include an RF up-converter that up-converts UL baseband signals generated by the modem subsystems 512 to corresponding RF carrier frequencies for transmissions over the antennas 516. In the receive path, the RF units 514 may include an RF down-converter that down-converts DL RF signals received from the antennas 516 to a baseband for processing by the modem subsystems 512. In some embodiments, the modem subsystems 512 and/or the RF units 514 may be configured based on BWP configurations and/or CA configurations received from the BS. In some embodiments, the same modem subsystem 512 and the same RF unit 514 can be used for all BWP configuration and all CA configurations.

Figure 6:
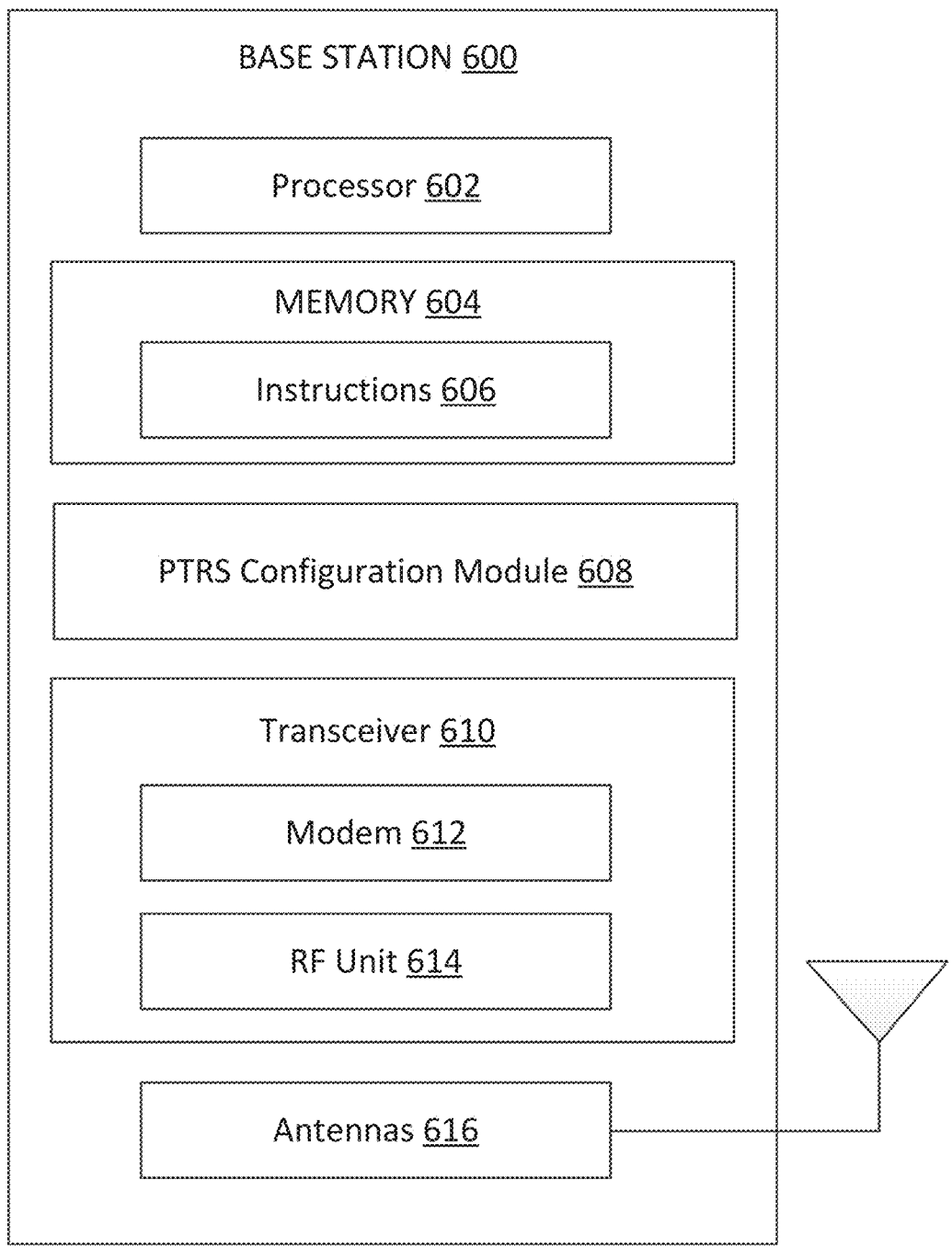
FIG. 6 is a block diagram of an exemplary base station (BS) according to some embodiments of the present disclosure.

FIG. 6 is a block diagram of an exemplary BS 600 according to embodiments of the present disclosure. The BS 600 may be a BS 105 as discussed above. As shown, the BS 600 may include a processor 602, a memory 604, a PTRS configuration module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 7-13 and 15. Instructions 606 may also be referred to as code, which may be interpreted broadly to include any type of computer-readable statement(s) as discussed above with respect to FIG. 5.

The PTRS configuration module 608 may be implemented via hardware, software, or combinations thereof. For example, the PTRS configuration module 608 may be implemented as a processor, circuit, and/or instructions 606 stored in the memory 604 and executed by the processor 602. In some examples, the PTRS configuration module 608 can be integrated within the modem subsystem 612. For example, the PTRS configuration module 608 can be implemented by a combination of software components (e.g., executed by a DSP or a general processor) and hardware components (e.g., logic gates and circuitry) within the modem subsystem 612.

The PTRS configuration module 608 may be used for various aspects of the present disclosure, for example, aspects of FIGS. 7-13 and 15. For example, the PTRS configuration module 608 is configured to determine CA configuration/reconfiguration, CC configuration/reconfiguration, and/or BWP configuration/switch for a UE such as the UEs 115 and 500, receive DC location reports and/or PTRS configuration selections from the UE, configure PTRSs for the UE avoiding the DC locations indicated in the reports or based on the PTRS configuration selections to facilitate phase tracking at the UE, and/or include PTRSs in DL signal transmissions, as described in greater detail herein.

As shown, the transceiver 610 may include the modem subsystem 612 and the RF unit 614. The transceiver 610 can be configured to communicate bi-directionally with other devices, such as the UEs 115 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or 500. The RF unit 614 may be further configured to perform analog beamforming in conjunction with the digital beamforming. Although shown as integrated together in transceiver 610, the modem subsystem 612 and the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to embodiments of the present disclosure. The antennas 616 may further receive data messages transmitted from other devices and provide the received data messages for processing and/or demodulation at the transceiver 610. The antennas 616 may include multiple antennas of similar or different designs in order to sustain multiple transmission links.

Figure 7:
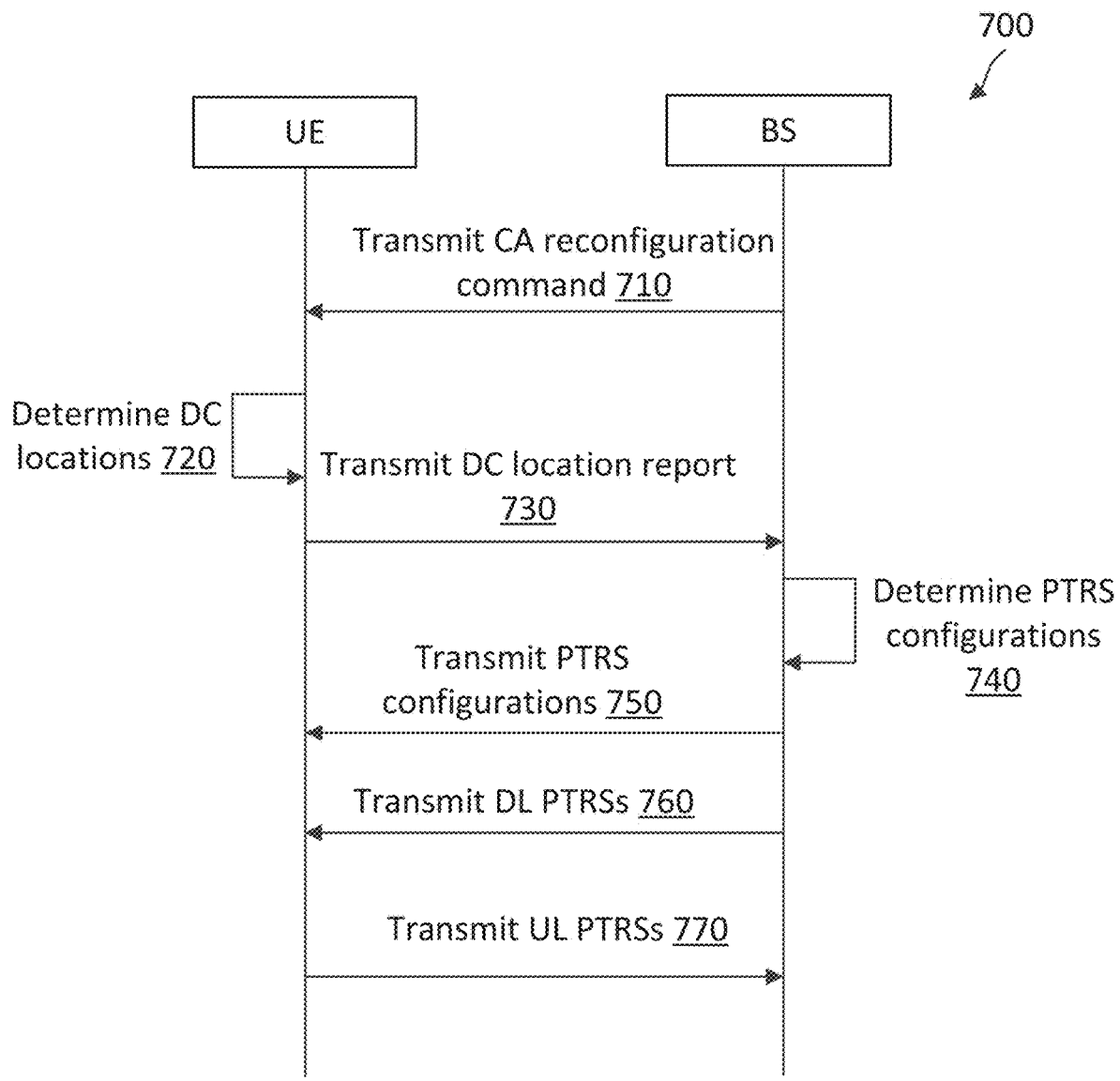
FIG. 7 is a signaling diagram illustrating a DC location reporting method according to some embodiments of the present disclosure.
Figure 8:
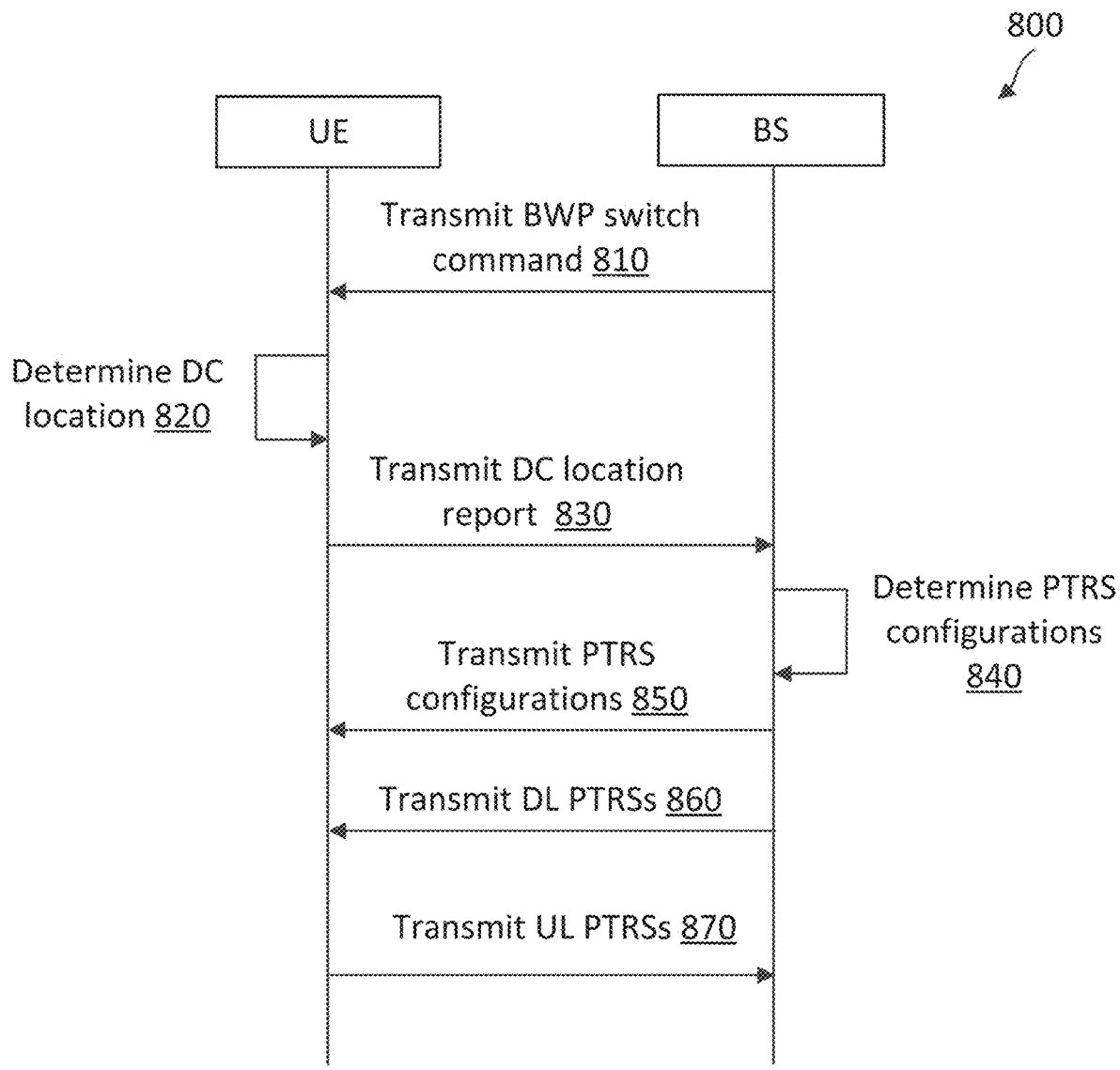
FIG. 8 is a signaling diagram illustrating a DC location reporting method according to some embodiments of the present disclosure.
Figure 9:
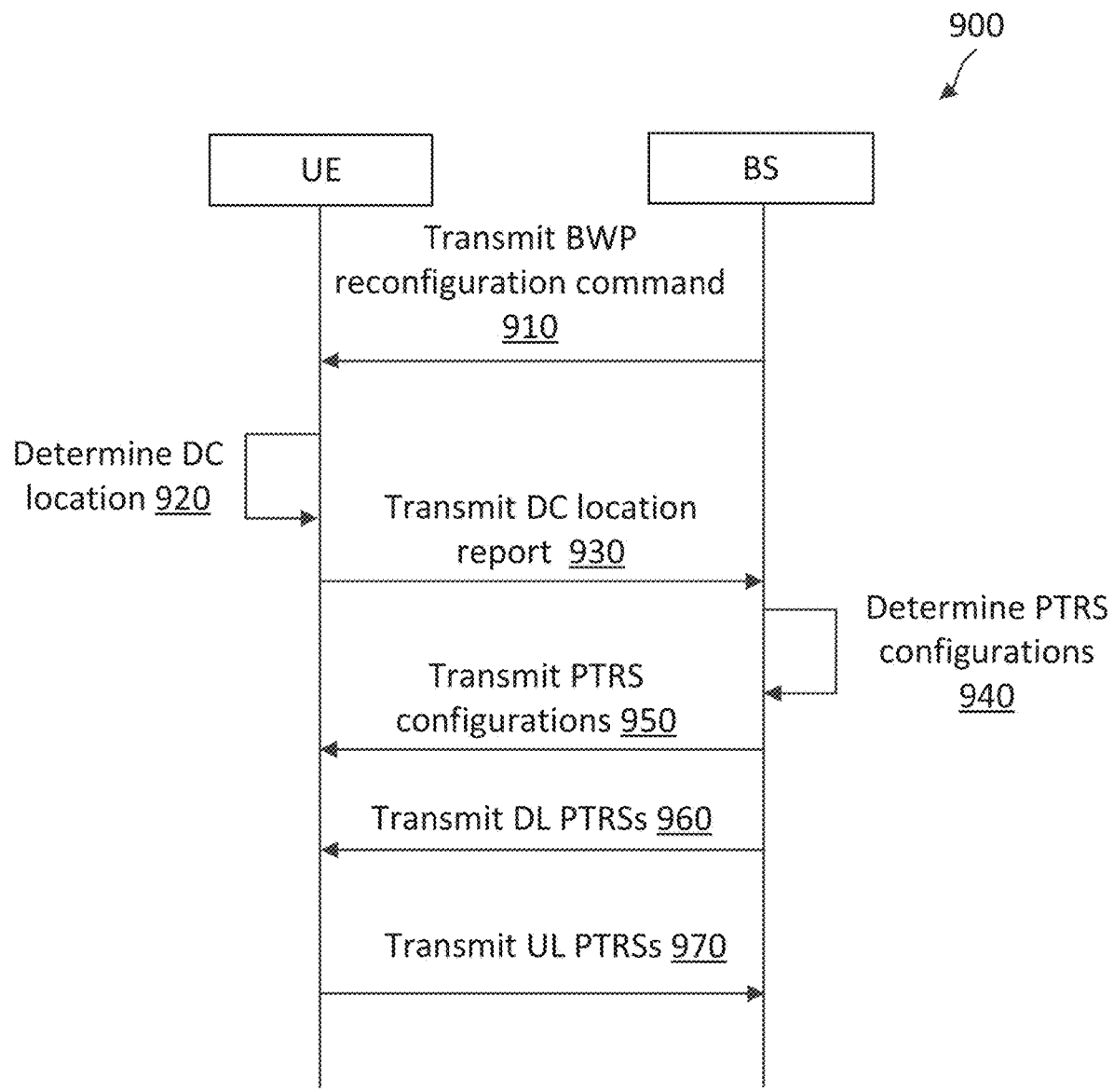
FIG. 9 is a signaling diagram illustrating a DC location reporting method according to some embodiments of the present disclosure.

FIGS. 7-9 illustrate various mechanisms for reporting DC locations based on events triggered by a CA reconfiguration, a BWP switch, and/or a BWP reconfiguration.

FIG. 7 is a signaling diagram illustrating a DC location reporting method 700 according to some embodiments of the procedure. The method 700 is employed by the network 100. Steps of the method 700 can be executed by computing devices (e.g., a processor, processing circuit, and/or other suitable component) of wireless communication devices, such as the BSs 105 and 600 and the UEs 115 and 500. As illustrated, the method 700 includes a number of enumerated steps, but embodiments of the method 700 may include additional steps before, after, and in between the enumerated steps. In some embodiments, one or more of the enumerated steps may be omitted or performed in a different order. The method 700 illustrates one BS and one UE for purposes of simplicity of discussion, though it will be recognized that embodiments of the present disclosure may scale to many more UEs and/or BSs. The method 700 illustrates a DC reporting based on CA reconfiguration.

At step 710, the BS transmits a CA reconfiguration command to the UE. The CA reconfiguration may include a removal of a CC (e.g., the CCs 210 and 210) and/or an addition of a CC to a previous CA configuration.

At step 720, upon receiving the CA reconfiguration command, the UE may determine a DC location based on the reconfigured CA configuration. In some embodiments, the UE may determine a DC location of the UE's transmitter and a DC location of the UE's receiver.

At step 730, the UE may transmit a DC location report to the BS. The DC location report may indicate the DC locations determined for the reconfigured CA configuration.

At step 740, the BS determines PTRS configurations based on the DC location report. For example, the BS may configure UL and/or DL resources for PTRS transmissions avoiding DC tones indicated in the received DC location report.

At step 750, the BS transmits PTRS configurations to the UE.

At step 760, the BS transmits PTRSs using the configured DL resources to facilitate phase tracking at the UE. For example, the PTRSs are included in DL signals carrying DL data.

At step 770, the UE transmits PTRSs using the configured UL resources to facilitate phase tracking at the BS. For example, the PTRSs are included in UL signals carrying UL data.

The triggering of DC location reports based on CA reconfigurations may be suitable when all configured BWPs have the same center frequency (e.g., as shown in the configuration 300) or when there is only one BWP within a carrier.

FIG. 8 is a signaling diagram illustrating a DC location reporting method 800 according to some embodiments of the procedure. The method 800 is employed by the network 100. Steps of the method 800 can be executed by computing devices (e.g., a processor, processing circuit, and/or other suitable component) of wireless communication devices, such as the BSs 105 and 600 and the UEs 115 and 500. As illustrated, the method 800 includes a number of enumerated steps, but embodiments of the method 800 may include additional steps before, after, and in between the enumerated steps. In some embodiments, one or more of the enumerated steps may be omitted or performed in a different order. The method 800 illustrates one BS and one UE for purposes of simplicity of discussion, though it will be recognized that embodiments of the present disclosure may scale to many more UEs and/or BSs. The method 800 illustrates a DC reporting based on a BWP switch.

At step 810, the BS transmits a BWP switch command to the UE. For example, the BWP switch command may switch one or more active BWPs (e.g., the BWPs 310, 320, 410, and 420) of the UE to other BWPs. In an embodiment, the BS may switch an active BWP of the UE using an RRC reconfiguration procedure.

At step 820, upon receiving the BWP switch command, the UE may determine a DC location based on an active BWP indicated by the BWP switch command. In some embodiments, the UE may determine a DC location of the UE's transmitter and a DC location of the UE's receiver At step 830, the UE may transmit a DC location report to the BS. The DC location report may indicate the DC location determined for the switched BWP.

At step 840, the BS determines PTRS configurations based on the DC location report. For example, the BS may configure UL and/or DL resources for PTRS transmissions avoiding DC tones indicated in the received DC location report.

At step 850, the BS transmits PTRS configurations to the UE.

At step 860, the BS transmits PTRSs using the configured DL resources to facilitate phase tracking at the UE. For example, the PTRSs are included in DL signals carrying DL data.

At step 870, the UE transmits PTRSs using the configured UL resources to facilitate phase tracking at the BS. For example, the PTRSs are included in UL signals carrying UL data.

FIG. 9 is a signaling diagram illustrating a DC location reporting method 900 according to some embodiments of the present disclosure. The method 900 is employed by the network 100. Steps of the method 900 can be executed by computing devices (e.g., a processor, processing circuit, and/or other suitable component) of wireless communication devices, such as the BSs 105 and 600 and the UEs 115 and 500. As illustrated, the method 900 includes a number of enumerated steps, but embodiments of the method 900 may include additional steps before, after, and in between the enumerated steps. In some embodiments, one or more of the enumerated steps may be omitted or performed in a different order. The method 900 illustrates one BS and one UE for purposes of simplicity of discussion, though it will be recognized that embodiments of the present disclosure may scale to many more UEs and/or BSs. The method 900 illustrates a DC reporting based on a BWP reconfiguration with CA configuration consideration.

At step 910, the BS transmits a BWP reconfiguration command to the UE. The BWP reconfiguration may include a removal of a BWP (e.g., the BWPs 310, 320, 410, and 420) and/or an addition of a BWP to a previous BWP configuration.

At step 920, upon receiving the BWP reconfiguration command, the UE may determine a DC location based on the reconfigured BWP or BWPs and a CA configuration in use by the UE. In some embodiments, the UE may determine a DC location of the UE's transmitter and a DC location of the UE's receiver.

At step 930, the UE may transmit a DC location report to the BS. The DC location report may indicate the DC location determined for the reconfigured BWP or BWPs.

At step 940, the BS determines PTRS configurations based on the DC location report. For example, the BS may configure UL and/or DL resources for PTRS transmissions avoiding DC tones indicated in the received DC location report.

At step 950, the BS transmits PTRS configurations to the UE.

At step 960, the BS transmits PTRSs using the configured DL resources to facilitate phase tracking at the UE. For example, the PTRSs are included in DL signals carrying DL data.

At step 970, the UE transmits PTRSs using the configured UL resources to facilitate phase tracking at the BS. For example, the PTRSs are included in UL signals carrying UL data.

In an embodiment, to avoid a large amount of UL DC location report signaling, a network may signal a limited potential combinations of active BWPs across all configured CCs. As such, the UE can signal the DC locations for the potential active BWP combinations.

In an embodiment, a BS (e.g., the BSs 105 and 600) may configure a set of reference BWPs. The configuration for the set of reference BWPs can be performed at the RRC layer for a particular UE. The set of reference BWPs can be within a single CC or across multiple CCs. In some embodiments, the set of reference BWPs can be a subset of configured BWPs of the UE. The UE may determine DC locations for the set of reference BWPs. In some embodiments, the UE may transmit a DC location report including a band report indicating a set of DC locations as a function of band combinations.

Figure 10:
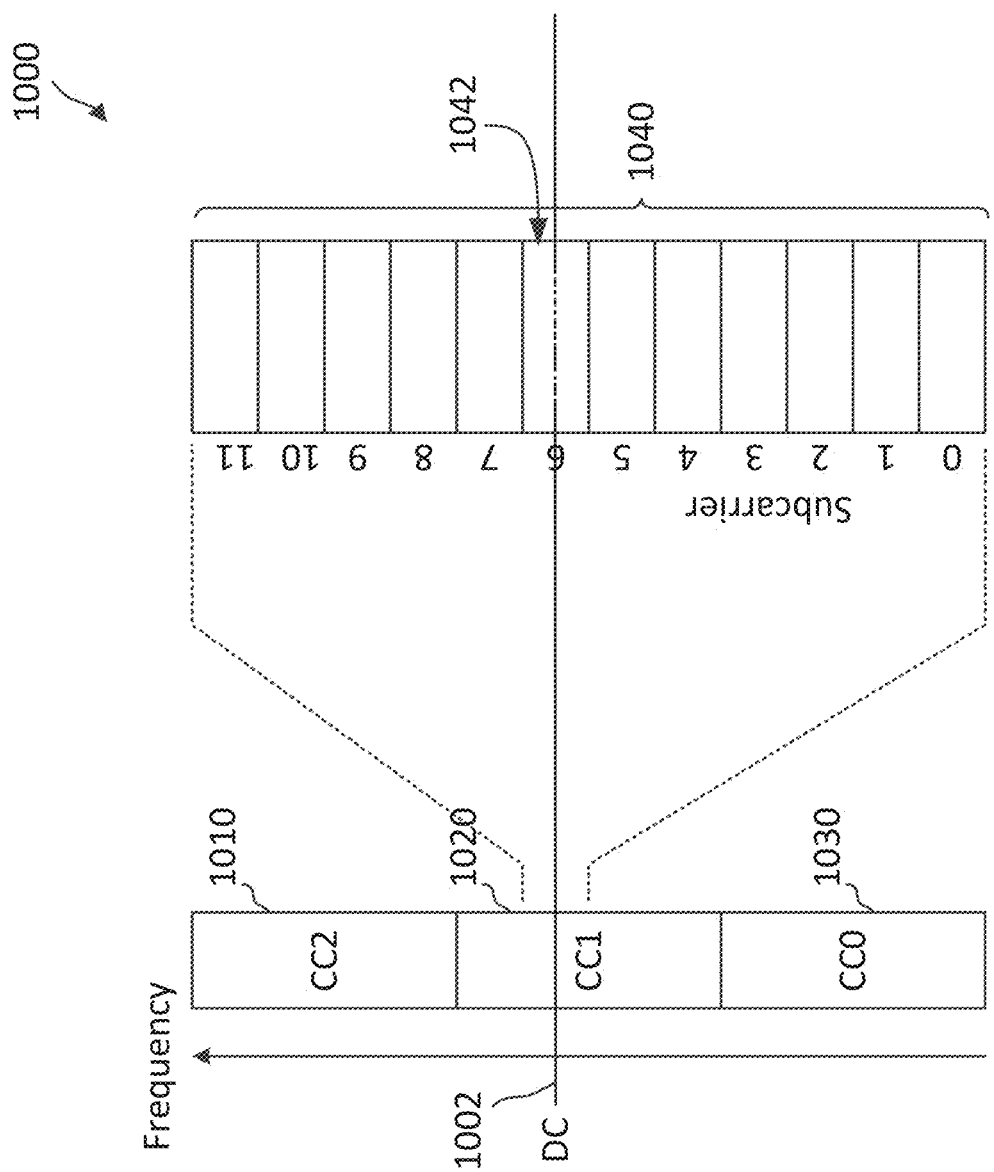
FIG. 10 illustrates a DC location reporting method according to some embodiments of the present disclosure.

FIG. 10 illustrates a DC location reporting method 1000 according to some embodiments of the present disclosure. The method can be employed by the network 100. In particular, the method 1000 can be implemented by a UE such as the UEs 115 and 500 for DC location reporting. In FIG. 10, the y-axis represents frequency in some constant units. The method 1000 can be used in conjunction with the methods 700, 800, and 900 described above with respect to FIGS. 7, 8, and 9, respectively. As an example, an RF chain of the UE may receive three intra-band CCs 1010, 1020, and 1030 (e.g., the CCs 210 and 220). The UE may use a single local oscillator to down-convert a received RF signal to a baseband signal with a DC frequency 1002. As shown, the DC frequency 1002 is mapped to a subcarrier 1042 indexed 6 within a resource block (RB) 1040 where the DC frequency 1002 resides. The UE may report the subcarrier index 6 within the RB 1040 to a BS (e.g., the BSs 105 and 600). For example, the UE may report a subcarrier index offset value to the BS. The DC location report message is described in greater detail herein below with respect to FIG. 11. Upon receiving the report, the BS may configure the UE with a PTRS that does not overlap with the subcarrier indexed 6 to avoid collision between the PTRS and the DC tone.

While the method 1000 is described in the context of reporting a DC location of the UE's receiver, the method 1000 can be applied to report a DC location of the UE's transmitter. For example, the DC location of the UEs transmitter may be based on the UE's baseband and up-conversion hardware implementation.

Figure 11:
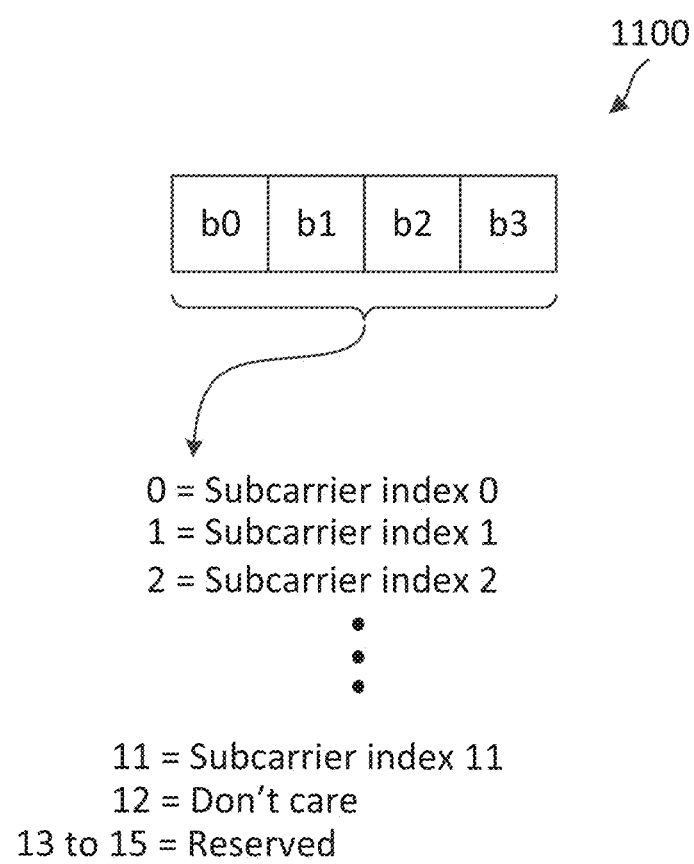
FIG. 11 illustrates a DC location report message element according to some embodiments of the present disclosure.

FIG. 11 illustrates a DC location report message element 1100 according to some embodiments of the present disclosure. The message element 1100 can be used by a UE such as the UEs 115 and 500 to report DC location information. As described above in the method 1000, a UE may report a subcarrier offset within an RB to indicate a DC location (e.g., the DC frequency 1002). In an embodiment, the message element 1100 may have a length of 4 bits (e.g., shown as b0, b1, b2, and b3). The message element 1100 can have values varying between 0 and 15.

For example, when the message element 1100 includes a value between 0 and 11, the value indicates a DC subcarrier index within an RB (e.g., the RB 1040) where the DC frequency resides. A value of 12 in the message element 1100 may indicate a don't care condition, where the DC tone may be outside of the band of interest or the UE may apply an algorithm with a strong DC rejection. A value of 13 in the message element 1100 may indicate a nondeterministic condition, where the DC tone may reside within an RB (e.g., the RB 1040), but the mapping of the DC tone to the subcarrier index may not be specified. This may correspond to the scenario when UE uses fast frequency hopping and thus the DC location changes rapidly. Remaining values of 14 and 15 may be reserved for future use.

The UE may transmit the message element 1100 via a physical uplink control channel (PUCCH) signaling or RRC signaling. The UE may provide DC location information to the BS using any suitable signaling configuration, which may be dependent on the implementation and/or application of the UE. For example, the UE may transmit a message element 1100 for each CC and/or each BWP. Alternatively, the UE may transmit a message element 1100 for a set of intra-band CCs (e.g., the CCs 1010, 1020, and 1030) in a CA scenario. Yet alternatively, the UE may transmit a message element 1100 for an entire band. For the scenario described in the method 1000, the UE may report a subcarrier index of 6 for DC location reporting.

In some embodiments, the UE may transmit two message elements 1100 (e.g., a total of 8 bits), one indicating a DC location of the UE's transmitter and another indicating a DC location of the UE's receiver. While the message element 1100 is illustrated with a bit-length of 4, the message element 1100 can be alternatively configured to include a different bit-length (e.g., 5, 8, or more) to achieve similar functionalities. The bit-length of 4 may be configured to support the reporting of a subcarrier offset in an RB (e.g., the RB 1040) having about twelve subcarriers (e.g., the subcarriers indexed 0-11 in FIG. 10) and to provide an additional don't care condition.

In some embodiments, the UE may include a BWP index or a CC index with each message element 1100. For example, the UE may report four DC locations for four BWPs by including a BWP index and a message element 1100 for each BWP in a report. Alternatively, the UE may report eight DC locations for eight CCs by including a CC index and a message element 1100 for each CC in a report.

In some other embodiments, a UE may report a DC location of the UE using an absolute radio frequency channel number (ARFCN) instead of using the message element 1100. For example, the UE may include an ARFCN for each corresponding BWP or each CC in a report.

In some other embodiments, a UE may have a DC frequency tone located between two adjacent subcarriers, where the DC tone may equally or comparably impact or interfere with both subcarriers. In such embodiments, the message element 1100 may be extended to include a length of about 5 bits with values varying between 0 and 31. For example, values between 0 and 13 may represent the same DC information as descried above. Other values, for example, between 14 and 25, may indicate that a DC location is between two adjacent subcarriers. For example, a value of 14 may indicate that the DC location is between subcarriers of indices 0 and 1. Similarly, a value of 15 may indicate that the DC location is between subcarriers of indices 1 and 2, and so on. Similarly or alternatively, a value of 25 may indicate that the DC location is between the subcarrier of index 11 in an RB and the subcarrier of index 0 in the next RB (e.g., the DC tone resides on the boundaries of two adjacent RBs). Remaining values of 26 to 31 may be reserved for future use. In some other embodiments, the values in the message elements 1100 may be alternatively configured to achieve similar functionalities.

FIG. 12 illustrates a PTRS RE-level offset configuration 1200 according to some embodiments of the present disclosure. The configuration 1200 may be employed by a network such as the network 100. In particular, a BS such as the BSs 105 and 600 may use the configuration 1200 to configure PTRSs based on DC location reports received from UEs such as the UEs 115 and 500. As shown, a PTRS configuration may be associated with a demodulation reference signal (DMRS) port configuration. Each DMRS port configuration refers to the mapping of a DMRS to physical REs or subcarriers for a particular antenna port. In addition, different types of DMRSs may have different DMRS port configurations.

In FIG. 12, the column 1210 shows PTRS-RE-offset configurations represented by binary values 00, 01, 10, and 11. The columns 1220, 1230, 1240, and 1250 show the subcarrier indices or offsets (e.g., in a decimal format) of a subcarrier or RE configured or mapped for PTRS transmissions associated with DMRS port numbers represented by 1000, 1001, 1002, and 1003, respectively, when up to 4 DMRS ports are configured. As an example, when the PTRS-RE-offset configuration is 01 and the associated DMRS port number is 1001, a PTRS may be transmitted using a resource element (RE) or a subcarrier at a subcarrier offset of 4 (e.g., at every symbol of a data signal) as shown by the dashed circle 1202. The PTRS-RE-offset configuration 1200 may be similar to the PTRS-RE-offset configuration defined in the 3GPP document TS 38.211 version 15.1.0, Apr. 3, 2018.

In some embodiments, a BS may determine a PTRS-RE-offset configuration for UL PTRSs and a PTRS-RE-offset configuration for DL PTRSs. In addition, a BS may determine a PTRS-RE-offset configuration based on a DMRS configuration type. For example, NR may support a DMRS configuration type 1 and a DMRS configuration type 2. Thus, a BS may determine a UL PTRS-RE-offset configuration and a DL PTRS-RE-offset configuration for DL PTRSs for DMRS configuration type 1 and a UL PTRS-RE-offset configuration and a DL PTRS-RE-offset configuration for DL PTRSs for DMRS configuration type 2.

In some embodiments, the use of DMRS configuration type 1 or DMRS configuration type 2 may depend on a UE-specific configuration. For example, DMRS configuration type 1 may support up to about 4 ports, while DMRS configuration type 2 may support up to about 6 ports (in the case of one DMRS symbol configuration). In addition, DMRS configuration type 1 may have a higher DMRS tone density than DMRS configuration type 2. Thus, DMRS configuration type 1 may allow for improved channel estimation performance. As such, DMRS configuration type 1 may be used for transmissions where low-rank, high-reliability is of importance, e.g., broadcast information. Conversely, DMRS configuration type 2 may be used for transmissions where high-rank, high data rate is of importance.

For the scenario described in the method 1000, where the UE's receiver DC tone overlaps with the subcarrier indexed 6, the BS may not configure the UE with a DL-PTRS-RE-offset of 10 (e.g., with subcarrier indexed 6 as shown by the dashed circle 1204) to avoid collision between a DL PTRS and the DC tone of the UE's receiver. Similarly, when a DC location report in the method 1000 includes a DC tone of the UE's transmitter, the BS may not configure the UE with a UL-PTRS-RE-offset of 10 to avoid collisions between a UL PTRS and a DC tone of the UE's transmitter. In an embodiment, a BS may not require the absolute frequency of the DC location for the determination of a DL-PTRS-RE-offset and/or a UL-PTRS-RE-offset.

In another example, a UE's receiver may include a DC frequency between the subcarriers indexed 5 and 6. For instances, the DC frequency may generate a peak signal at the UE's receiver causing interference to the subcarriers indexed 5 and 6. Thus, the BS may not configure the UE with a DL-PTRS-RE-offset of 01 or 10 to avoid collision between a DL PTRS and the DC peak signal at the subcarriers indexed 5 and 6.

Figure 13:
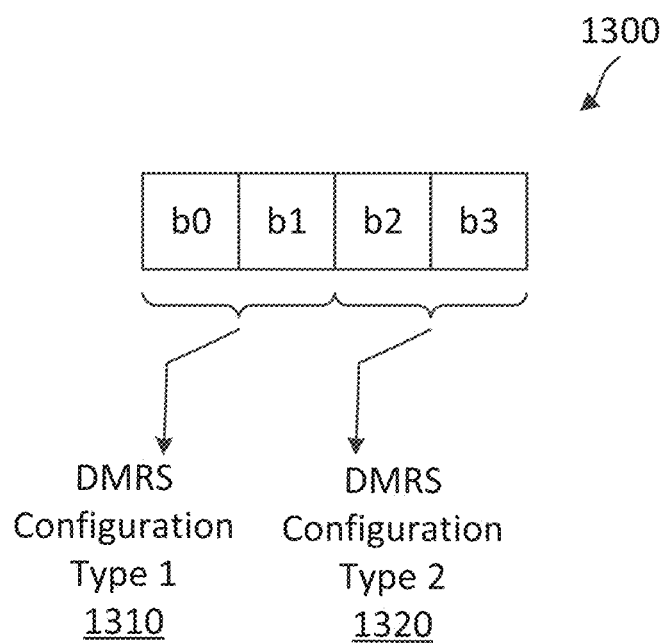
FIG. 13 illustrates a DC location report message element according to some embodiments of the present disclosure.

FIG. 13 illustrates a DC location report message element 1300 according to some embodiments of the present disclosure. The message element 1300 can be used by a UE such as the UEs 115 and 500 to report DC location information. As described above in the method 1000, a UE may report a subcarrier offset within an RB to indicate a DC location (e.g., the DC frequency 1002). In an embodiment, the message element 1300 may have a length of 4 bits (e.g., shown as b0, b1, b2, and b3). The message element 1300 may include a field 1310 and a field 1320. The field 1310 may be about 2 bits in length and may indicate a PTRS-RE-offset configuration for DMRS configuration type 1. The field 1320 may be about 2 bits in length and may indicate a PTRS-RE-offset configuration for DMRS configuration type 2. The PTRS-RE-offset configuration in the field 1310 or the field 1320 may correspond to values in the column 1210 of the configuration 1200. In other words, instead of having a UE to report the subcarrier location of a DC frequency of the UE's transmitter or the UE's receiver, the UE may select a PTRS-RE-offset configuration that the BS may use and report the PTRS-RE-offset configuration to the BS directly. Subsequently, the BS may configure PTRSs based on the PTRS-RE-offset configuration selected by the UE.

In some embodiments, the UE may transmit two message elements 1300, one indicating a PTRS-RE-offset configuration for UL and another indicating a PTRS-RE-offset configuration for DL. While the message element 1300 is illustrated with a bit-length of 4, the message element 1300 can be alternative configured to include a different bit-length (e.g., 6, 8, or more) to achieve similar functionalities when the number DMRS port configurations increases or the number of DMRS types increases.

Figure 14:
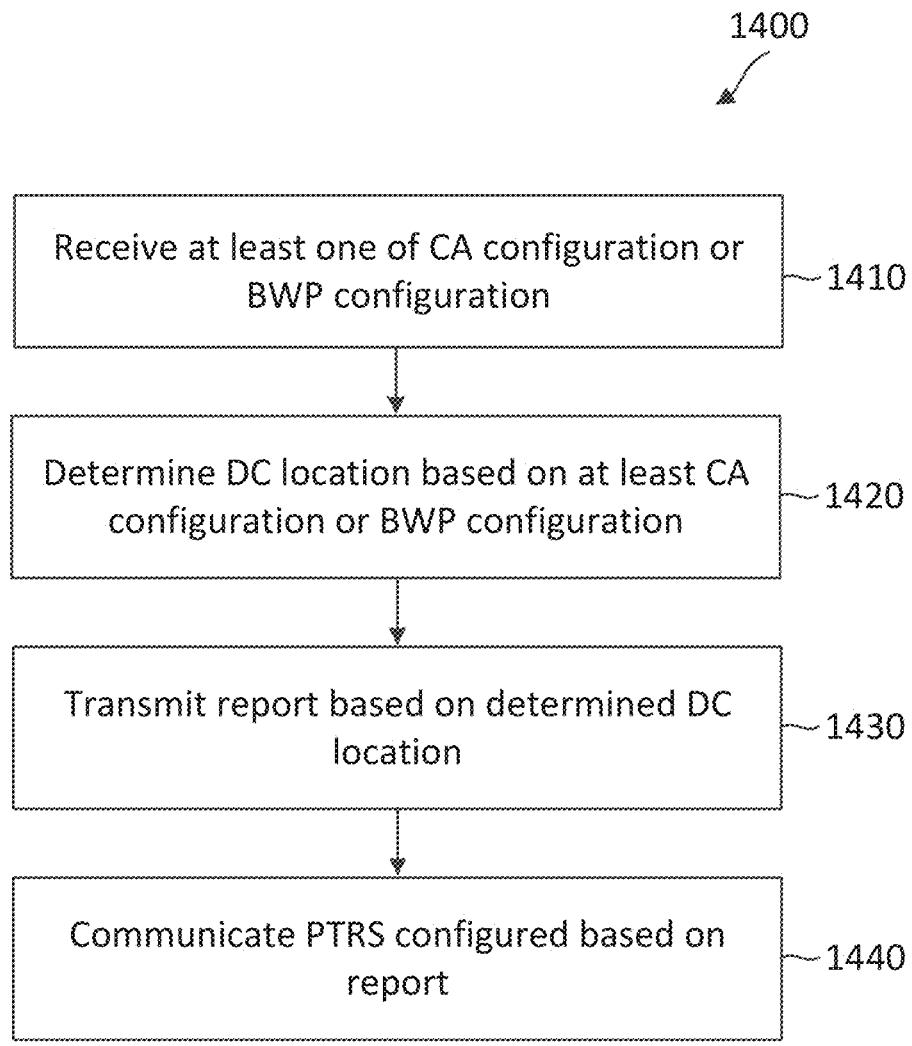
FIG. 14 is a flow diagram of a DC location reporting and PTRS communication method according to embodiments of the present disclosure.

FIG. 14 is a flow diagram of a DC location reporting and PTRS communication method 1400 according to embodiments of the present disclosure. Steps of the method 1400 can be executed by a computing device (e.g., a processor, processing circuit, and/or other suitable component) of a wireless communication device or other suitable means for performing the steps. For example, a wireless communication device, such as the UE 115 or UE 500, may utilize one or more components, such as the processor 502, the memory 504, the DC location reporting module 508, the transceiver 510, the modem 512, and the one or more antennas 516, to execute the steps of method 1400. Additionally or alternatively, and in particular, processor 502 may be configured to perform step 1420 and transceiver 510 may be configured to perform steps 1410, 1430, and/or optional step 1440. The method 1400 may employ similar mechanisms as in the methods 700, 800, 900, and 1000 described above with respect to FIGS. 7, 8, 9, and 10, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes receiving, by a wireless communication device from a base station (e.g., the BSs 105 and 600), at least one of CA configuration or a BWP configuration. In some instances, the CA configuration may be a CA reconfiguration and the BWP configuration may be associated with a BWP reconfiguration or an active BWP switch.

At step 1420, the method 1400 includes determining, by the wireless communication device, a DC location (e.g., the DC locations 202, 204, 206, and 1002) based on at least one of the CA configuration or the BWP configuration.

At step 1430, the method 1400 includes transmitting, by the wireless communication device to the base station, a report based on the determined DC location.

At step 1440, the method 1400 optionally includes communicating, by the wireless communication device with the base station, a phase tracking reference signal (PTRS) configured based on the report.

In an embodiment, the report may include subcarrier offset information of one or more subcarriers overlapping with a DC location of the wireless communication device. For example, the subcarrier offset information may indicate subcarrier index 6 for the method 1000 described above. Alternatively, the subcarrier offset information may indicate that the DC location is between two adjacent subcarriers. The report may include a message element similar to the message element 1100. Alternatively, the report may indicate the location of an RB including the DC location. In such an embodiment, the wireless communication device may receive an RE mapping (e.g., the PTRS-RE-offset configurations in the column 1210 of FIG. 12) from the BS for communicating the PTRS.

In an embodiment, the wireless communication device may determine an RE mapping for communicating the PTRS based on the determined DC location and may include the RE mapping in the report. For example, the report may include a message element similar to the message element 1300.

In an embodiment, the DC location may correspond to the DC location of a transmitter of the wireless communication device. In such an embodiment, communicating, by the wireless communication device with the base station, the PTRS can include transmitting the PTRS to the base station.

In an embodiment, the DC location may correspond to the DC location of a receiver of the wireless communication device. In such an embodiment, communicating, by the wireless communication device with the base station, the PTRS can include receiving the PTRS from the base station.

Figure 15:
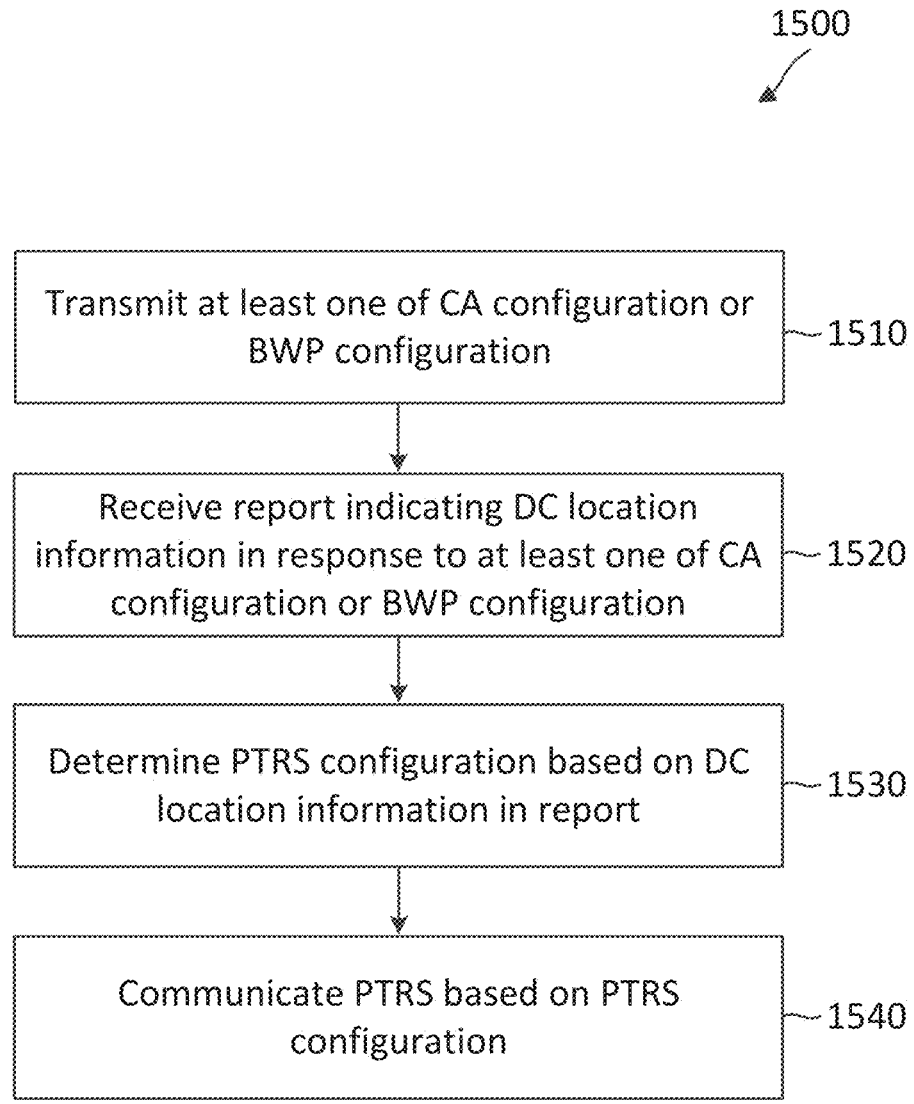
FIG. 15 is a flow diagram of a PTRS communication method according to some embodiments of the present disclosure.

FIG. 15 is a flow diagram of a PTRS communication method 1500 according to embodiments of the present disclosure. Steps of the method 1500 can be executed by a computing device (e.g., a processor, processing circuit, and/or other suitable component) of a wireless communication device or other suitable means for performing the steps. For example, a wireless communication device, such as the BS 105 or BS 600, may utilize one or more components, such as the processor 602, the memory 604, the PTRS configuration module 608, the transceiver 610, and the one or more antennas 616, to execute the steps of method 1500. Additionally or alternatively, and in particular, processor 602 may be configured to perform step 1530 and transceiver 610 may be configured to perform steps 1510, 1520, and/or optional step 1540. The method 1500 may employ similar mechanisms as in the methods 700, 800, 900, and 1000 and the configuration 1200 described above with respect to FIGS. 7, 8, 9, 10, and 12, respectively. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the method 1500 includes transmitting, by a BS to a wireless communication device (e.g., the UEs 115 and 500), at least one of a CA configuration or a BWP configuration. In some instances, the CA configuration may be a CA reconfiguration and the BWP configuration may be associated with a BWP reconfiguration or an active BWP switch.

At step 1520, the method 1500 includes receiving, by the BS from the wireless communication device, a report indicating DC location information associated with the wireless communication device in response to at least one of the CA configuration or the BWP configuration.

At step 1530, the method 1500 includes determining, by the BS, a PTRS configuration (e.g., an RE mapping similar to the PTRS-RE-offset configurations in the column 1210 of FIG. 12) based on the DC location information in the report.

At step 1540, the method 1500 optionally includes communicating, by the BS with the wireless communication device, a PTRS based on the determined PTRS configuration.

In an embodiment, the report may include subcarrier offset information of one or more subcarriers overlapping with a DC location of the wireless communication device. For example, the subcarrier offset information may indicate subcarrier index 6 for the method 1000 described above. Alternatively, the subcarrier offset information may indicate that the DC location is between two adjacent subcarriers. The report may include a message element similar to the message element 1100. Alternatively, the report may include an RB including a DC location of the wireless communication device. In an embodiment, the report may include an RE mapping for communicating the PTRS. For example, the report may include a message element similar to the message element 1300. In an embodiment, the BS may determine the PTRS configuration by configuring UL and/or DL resources for UL and/or PTRS transmissions to avoid using subcarriers that overlap with the DC location of the wireless communication device.

In an embodiment, the DC location may correspond to the DC location of a transmitter of the wireless communication device. In such an embodiment, communicating, by the BS with the wireless communication device, the PTRS can include receiving the PTRS from the BS based on the DC location information in the report.

In an embodiment, the DC location may correspond to the DC location of a receiver of the wireless communication device. In such an embodiment, communicating, by the BS with the wireless communication device, the PTRS can include transmitting the PTRS to the BS based on the DC location information in the report.

In an embodiment, for UL, DC location signaling is included in an RRCReconfigurationComplete message. A UE reports a DC location per configured BWP and per serving cell upon a BWP configuration and a serving cell configuration. A UE may send an RRCReconfigurationComplete message to a BS to confirm the successful completion of an RRC connection reconfiguration. The RRCReconfigurationComplete message includes an uplinkTxDirectCurrentList information element (IE). The uplinkTxDirectCurrentList IE indicates the Tx Direct Current locations per serving cell for each configured UL BWP in the serving cell based on the BWP numerology and the associated carrier bandwidth. The UplinkTxDirectCurrentList IE includes a sequence of UplinkTxDirectCurrentCell fields as shown below:

UplinkTxDirectCurrentList::=SEQUENCE (SIZE (1 . . . maxNrofServingCells)) OF UplinkTxDirectCurrentCell Each UplinkTxDirectCurrentCell field includes a sequence of tuples each including a servCellIndex field and a uplinkDirectCurrentBWP field as shown below:

```
UplinkTxDirectCurrentCell ::= SEQUENCE {
   servCellIndex          ServCellIndex,(config serving cell, 0 = pcell, 1 = scell
   uplinkDirectCurrentBWP SEQUENCE (SIZE (1..maxNrofBWPs)) OF
                          UplinkTxDirectCurrentBWP,
   ...
}.
```

The servCellIndex field indicates a serving cell ID of the serving cell corresponding to the uplinkDCLocationsPerBWP. For instance, the servCellIndex field may be set to a value of 0 to indicate a primary cell (PCell), a value of 1 to indicate a first secondary cell (SCell), or a value of 2 to indicate a second SCell. The uplinkDirectCurrentBWP field indicates Tx Direct Current locations for all the uplink BWPs configured at the corresponding serving cell.

The uplinkDirectCurrentBWP field includes a sequence of tuples each including a bwp-Id field, a shift7dot5 kHz field, and a txDirectCurrentLocation field as shown below:

```
UplinkTxDirectCurrentBWP ::= SEQUENCE {
   bwp-Id                 BWP-Id,(4 BWPs)
   shift7dot5kHz          BOOLEAN,
   txDirectCurrentLocation INTEGER (0..3301)
}.
```

The bwp-Id field indicates the BWP-Id of the corresponding uplink BWP. The shift7dot5 kHz field indicates whether there is 7.5 kHz shift or not. A 7.5 kHz shift is applied if the field is set to TRUE. The 7.5 kHz shift may be applied, for example, to the txDirectCurrentLocation representing a subcarrier distance from a reference point. Hence, a 7.5 kHz shift may be applied, for example 7.5 kHz may be added, to the frequency value of the subcarrier indicated by the subcarrier index indicated by txDirectCurrentLocation. The new DC location may be indicated by the resulting value after the shift is applied (if indicated by shift7dot5 kHz). Otherwise 7.5 kHz shift is not applied. The txDirectCurrentLocation field indicates the uplink Tx Direct Current location for the carrier. The txDirectCurrentLocation field is set to a value in the value range between 0 and 3299 to indicate the subcarrier index within the carrier corresponding to the numerology of the corresponding uplink BWP, a value of 3300 to indicate "Outside the carrier", and a value of 3301 to indicate "Undetermined position within the carrier". For instance, each UE may be configured with up to about four BWPs for each CC. As such, a UE may report up to about four UplinkTxDirectCurrentBWP fields for each CC, where each UplinkTxDirectCurrentBWP field may correspond to one BWP for a given CC.

Accordingly, in some instances, a UE may include a band report including DC locations as a function of configured bands or BWPs (e.g., the four BWPs) using the UplinkTxDirectCurrentList IE. For example, the DC location reports in the methods 700, 800, 900, 1400, and/or 1500 described above with respect to FIGS. 7, 8, 9, 14, and/or 15, respectively, may indicate DC locations using the UplinkTxDirectCurrentList IE. Further, in some instances, the UE may transmit a DC location report by transmitting an RRCReconfigurationComplete message based upon a BWP configuration, a BWP switch, a BWP reconfiguration, and/or a serving cell configuration.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    receiving, by a wireless communication device, a carrier aggregation (CA) configuration configuring the wireless communication device for CA with a plurality of component carriers (CCs);
    determining, by the wireless communication device based on the CA configuration, a single direct current (DC) location for a set of bandwidth parts (BWPs) associated with the plurality of CCs; and
    transmitting, by the wireless communication device, a report including an indication of the single DC location for the plurality of CCs.

2. The method of claim 1, the report further including one or more BWP indices identifying the set of BWPs.

3. The method of claim 1, further comprising:
    receiving, by the wireless communication device, a BWP configuration configuring the wireless communication device with the set of BWPs.

4. The method of claim 1, wherein the determining includes determining a resource block (RB) that includes the single DC location for a BWP of the set of BWPs, and wherein the transmitting includes transmitting the report including information associated with the determined RB.

5. The method of claim 1, wherein the determining includes determining one or more subcarriers overlapping with the single DC location for a BWP of the set of BWPs, and wherein the transmitting includes transmitting the report including subcarrier offset information of the determined one or more subcarriers.

6. The method of claim 1, further comprising:
    communicating, by the wireless communication device with a network entity, a phase tracking reference signal (PTRS) configured based on the report.

7. The method of claim 6, further comprising:
    receiving, by the wireless communication device from the network entity in response to the report, a resource element (RE) mapping for communicating the PTRS.

8. The method of claim 6, further comprising:
    determining, by the wireless communication device, a resource element (RE) mapping for communicating the PTRS based on the single DC location,
    wherein the transmitting includes transmitting the report including the determined RE mapping.

9. The method of claim 6, wherein the single DC location is associated with a transmitter of the wireless communication device, and wherein the communicating includes:
    transmitting, by the wireless communication device to the network entity, the PTRS.

10. The method of claim 6, wherein the single DC location is associated with a receiver of the wireless communication device, and wherein the communicating includes:
    receiving, by the wireless communication device from the network entity, the PTRS.

11. The method of claim 1, wherein the plurality of CCs are intra-band CCs.

12. A first wireless communication device, comprising:
    a memory;
    a transceiver; and
    a processor in communication with the memory and the transceiver, wherein the first wireless communication device is configured to:
        receive, via the transceiver, a carrier aggregation (CA) configuration configuring the wireless communication device for CA with a plurality of component carriers (CCs);
        determine, based on the CA configuration, a single direct current (DC) location for a set of bandwidth parts (BWPs) associated with the plurality of CCs; and
        transmit, via the transceiver, a report including an indication of the single DC location for the plurality of CCs.

13. The first wireless communication device of claim 12, the report further including a BWP index identifying the set of BWPs.

14. The first wireless communication device of claim 12, wherein the first wireless communication device is further configured to:
receive, via the transceiver, a BWP configuration configuring the wireless communication device with the set of BWPs.

15. The first wireless communication device of claim 12, wherein the first wireless communication device configured to determine the single DC location comprises the first wireless communication device configured to determine a resource block (RB) that includes the single DC location for a BWP of the set of BWPs, and wherein the first wireless communication device configured to transmit the report comprises the first wireless communication device configured to transmit the report including information associated with the determined RB.

16. The first wireless communication device of claim 12, the first wireless communication device configured to determine the single DC location comprises the first wireless communication device configured to determine one or more subcarriers overlapping with the single DC location for a BWP of the set of BWPs, and the first wireless communication device configured to transmit the report comprises the first wireless communication device configured to transmit the report including subcarrier offset information of the determined one or more subcarriers.

17. The first wireless communication device of claim 12, wherein the first wireless communication device is further configured to:
communicate, with a network entity via the transceiver, a phase tracking reference signal (PTRS) configured based on the report.

18. The first wireless communication device of claim 17, wherein the first wireless communication device is further configured to:
receive, via the transceiver from the network entity in response to the report, a resource element (RE) mapping for communicating the PTRS.

19. The first wireless communication device of claim 17, wherein the first wireless communication device is further configured to:
determine a resource element (RE) mapping for communicating the PTRS based on the single DC location,
wherein the first wireless communication device configured to transmit the report comprises the first wireless communication device configured to transmit the report including the determined RE mapping.

20. The first wireless communication device of claim 17, wherein the single DC location is associated with a transmitter of the wireless communication device, and wherein the first wireless communication device configured to communicate the PTRS comprises:
the first wireless communication device configured to transmit, via the transceiver to the network entity, the PTRS.

21. The first wireless communication device of claim 17, wherein the single DC location is associated with a receiver of the wireless communication device, and wherein the first wireless communication device configured to communicate the PTRS comprises:
the first wireless communication device configured to receive, via the transceiver from the network entity, the PTRS.

22. The first wireless communication device of claim 12, wherein the plurality of CCs are intra-band CCs.

23. A non-transitory, computer-readable medium having program code recorded thereon, wherein the program code comprises instructions executable by a processor of a first wireless communication device to cause the first wireless communication device to:
receive a carrier aggregation (CA) configuration configuring the wireless communication device for CA with a plurality of component carriers (CCs);
determine, based on the CA configuration, a single direct current (DC) location for a set of bandwidth parts (BWPs) associated with the plurality of CCs; and
transmit a report including an indication of the single DC location for the plurality of CCs.

24. The non-transitory, computer-readable medium of claim 23, the report further including a BWP index identifying the set of BWPs.

25. A first wireless communication device, comprising:
means for receiving a carrier aggregation (CA) configuration configuring the wireless communication device for CA with a plurality of component carriers (CCs);
means for determining, based on the CA configuration, a single direct current (DC) location for a set of bandwidth parts (BWPs) associated with the plurality of CCs; and
means for transmitting a report including an indication of the single DC location for the plurality of CCs.

26. The first wireless communication device of claim 25, the report further including a BWP index identifying the set of BWPs.

* * * * *